(12) United States Patent
Obaditch et al.

(10) Patent No.: US 10,286,481 B2
(45) Date of Patent: May 14, 2019

(54) FSW TOOL WITH GRADUATED COMPOSITION CHANGE

(71) Applicant: Fluor Technologies Corporation, Sugar Land, TX (US)

(72) Inventors: Christopher Obaditch, Corona Del Mar, CA (US); Glenn J. Grant, Benton City, WA (US)

(73) Assignee: Fluor Technologies Corporation, Sugar Land, TX (US)

( * ) Notice: Subject to any disclaimer, the term of this patent is extended or adjusted under 35 U.S.C. 154(b) by 126 days.

(21) Appl. No.: 15/218,828

(22) Filed: Jul. 25, 2016

(65) Prior Publication Data

US 2016/0332252 A1 Nov. 17, 2016

Related U.S. Application Data

(63) Continuation of application No. 13/669,309, filed on Nov. 5, 2012, now Pat. No. 9,440,288.

(51) Int. Cl.
| | | |
|---|---|---|
| *B23K 20/12* | (2006.01) |
| *B22F 3/15* | (2006.01) |
| *B22F 7/00* | (2006.01) |
| *B22F 7/06* | (2006.01) |
| *C22C 1/04* | (2006.01) |
| *C22C 30/00* | (2006.01) |
| *B22F 5/00* | (2006.01) |

(52) U.S. Cl.
CPC ............ *B23K 20/1255* (2013.01); *B22F 3/15* (2013.01); *B22F 7/06* (2013.01); *C22C 1/04* (2013.01); *C22C 30/00* (2013.01); *B22F 2005/002* (2013.01); *B22F 2999/00* (2013.01)

(58) Field of Classification Search
None
See application file for complete search history.

(56) References Cited

U.S. PATENT DOCUMENTS

| | | | |
|---|---|---|---|
| 4,682,724 A | 7/1987 | Hahn |
| 6,070,784 A | 6/2000 | Holt et al. |
| 6,450,395 B1 | 9/2002 | Weeks et al. |
| 6,543,671 B2 | 4/2003 | Hatten et al. |
| | (Continued) | |

FOREIGN PATENT DOCUMENTS

| | | |
|---|---|---|
| CN | 102601516 | 7/2012 |
| EP | 2030717 | 3/2009 |
| | (Continued) | |

OTHER PUBLICATIONS

Mishra et al., "Friction stir welding and processing", Materials Science and Engineering R 50, pp. 1-78, 2005.

(Continued)

*Primary Examiner* — Devang R Patel
(74) *Attorney, Agent, or Firm* — Conley Rose, PC

(57) ABSTRACT

A friction stir welding (FSW) tool tip is described. The tool tip comprises a pin portion and a body portion that meet to form a shoulder. The tool tip has a graduated change in composition along its length. In some embodiments, the alloy composition near the end of the pin differs from the alloy composition of the body by at least 0.5% by wt of at least one element. A method of manufacturing a FSW tool tip having a gradual compositional change is also described.

11 Claims, 9 Drawing Sheets

(56) References Cited

U.S. PATENT DOCUMENTS

| | | | |
|---|---|---|---|
| 6,607,119 | B2 | 8/2003 | Engelhard et al. |
| 7,032,800 | B2 | 4/2006 | Subramanian et al. |
| 7,048,175 | B2 | 5/2006 | Runyan |
| 7,152,776 | B2 | 12/2006 | Nelson et al. |
| 7,494,040 | B2 | 2/2009 | Babb et al. |
| 7,703,656 | B2 | 4/2010 | Park et al. |
| 7,743,961 | B2 | 6/2010 | Maruko et al. |
| 7,832,613 | B2 | 11/2010 | Hanlon |
| 7,848,837 | B2 | 12/2010 | Badarinarayan et al. |
| 7,874,471 | B2 | 6/2011 | Fairchild et al. |
| 7,975,896 | B2 | 7/2011 | Maciel |
| 8,011,560 | B2 | 9/2011 | Chen et al. |
| 8,434,661 | B2 | 5/2013 | Hovanski et al. |
| 9,283,637 | B2 | 3/2016 | Grant et al. |
| 9,440,288 | B2 | 9/2016 | Obaditch et al. |
| 2004/0079454 | A1 | 4/2004 | Babel et al. |
| 2005/0035173 | A1 | 2/2005 | Steel et al. |
| 2005/0045694 | A1 | 3/2005 | Subramanian et al. |
| 2006/0086775 | A1 | 4/2006 | Trapp |
| 2006/0157531 | A1 | 7/2006 | Packer et al. |
| 2008/0041921 | A1 | 2/2008 | Creehan et al. |
| 2008/0096038 | A1 | 4/2008 | Nagonao |
| 2008/0101977 | A1 | 5/2008 | Eason et al. |
| 2009/0200358 | A1 | 8/2009 | Chen et al. |
| 2009/0236403 | A1 | 9/2009 | Feng et al. |
| 2010/0163601 | A1 | 7/2010 | Grooms et al. |
| 2010/0243714 | A1 | 9/2010 | Allehaux et al. |
| 2010/0252171 | A1 | 10/2010 | Feng et al. |
| 2010/0288817 | A1 | 11/2010 | Yao |
| 2011/0076419 | A1 | 3/2011 | Yang et al. |
| 2011/0309131 | A1 | 11/2011 | Hovanski et al. |
| 2012/0125973 | A1 | 5/2012 | Packer et al. |
| 2012/0237788 | A1 | 9/2012 | Fujii et al. |
| 2012/0261197 | A1 | 10/2012 | Miess et al. |
| 2012/0273113 | A1 | 11/2012 | Hovanski et al. |
| 2013/0126588 | A1 | 5/2013 | Grant et al. |

FOREIGN PATENT DOCUMENTS

| | | | |
|---|---|---|---|
| EP | 2030717 | A1 | 3/2009 |
| EP | 1918059 | | 1/2012 |
| EP | 1918059 | B1 | 1/2012 |
| EP | 1796865 | | 6/2012 |
| EP | 1796865 | B1 | 6/2012 |
| EP | 2514552 | | 10/2012 |
| EP | 2514552 | A1 | 10/2012 |
| JP | 2003326372 | | 5/2002 |
| JP | 2003033873 | A | 2/2003 |
| JP | 2003326372 | A * | 11/2003 |
| JP | 2003326372 | A | 11/2003 |
| JP | 2007237258 | A | 9/2007 |
| JP | 2008132524 | A | 6/2008 |
| JP | 2009255170 | | 3/2009 |
| JP | WO2007102380 | A1 | 7/2009 |
| JP | 2009255170 | A | 11/2009 |
| JP | 2012139695 | A | 7/2012 |
| KR | 20050047232 | A | 5/2005 |
| WO | 0185385 | A1 | 11/2001 |
| WO | 200185385 | | 11/2001 |
| WO | 2007109719 | A2 | 9/2007 |
| WO | 2007140043 | | 12/2007 |
| WO | 2007140043 | A2 | 12/2007 |
| WO | 2008102209 | | 8/2008 |
| WO | 2008102209 | A2 | 8/2008 |
| WO | 2009119543 | | 10/2009 |
| WO | 2009119543 | A1 | 10/2009 |
| WO | 2009146172 | A2 | 12/2009 |
| WO | 2012086488 | | 6/2012 |
| WO | 2012086488 | A1 | 6/2012 |
| WO | 2012086489 | | 6/2012 |
| WO | 2012086489 | A1 | 6/2012 |
| WO | 2012086490 | | 6/2012 |
| WO | 2012086490 | A1 | 6/2012 |
| WO | 2012133412 | | 10/2012 |
| WO | 2012133412 | A1 | 10/2012 |
| WO | 2014070211 | A1 | 5/2014 |

OTHER PUBLICATIONS

PCT Search Report and Written Opinion dated May 14, 2013 for PCT/US2012/063607 filed Nov. 5, 2012 entitled "Friction Stir Welding Tool with Graduate Composition Change".

U.S. Appl. No. 13/669,309, Office Action, dated Sep. 17, 2013, 17 pages.

U.S. Appl. No. 13/669,309, Final Office Action, dated Jan. 27, 2014, 17 pages.

U.S. Appl. No. 13/669,309, Office Action, dated Sep. 10, 2014, 13 pages.

U.S. Appl. No. 13/669,309, Final Office Action, dated Apr. 16, 2015, 15 pages.

U.S. Appl. No. 13/669,309, Office Action, dated Nov. 23, 2015, 17 pages.

U.S. Appl. No. 13/669,309, Notice of Allowance, dated Apr. 14, 2016, 9 pages.

U.S. Appl. No. 13/669,309, Corrected Notice of Allowability, dated Jul. 27, 2016, 2 pages.

International Application No. PCT/US2012/063607, International Preliminary Report on Patentability, dated Jan. 20, 2015, 12 pages.

Japan Patent Application No. 2015-541745, Office Action, dated Aug. 29, 2016, 13 pages.

Japan Patent Application No. 2015-541745, Office Action, dated Jan. 4, 2017, 8 pages.

Japan Patent Application No. 2015-541745, Decision of Rejection, dated May 8, 2017, 8 pages.

Office Action dated Jun. 14, 2013, U.S. Appl. No. 13/683,126, filed Nov. 21, 2012.

Office Action dated Dec. 4, 2013, U.S. Appl. No. 13/968,230, filed Aug. 15, 2013.

Final Office Action dated Oct. 2, 2014, U.S. Appl. No. 13/757,211, filed Feb. 1, 2013.

Office Action dated Apr. 15, 2014, U.S. Appl. No. 13/757,211, filed Feb. 1, 2013.

Office Action dated Jul. 17, 2015, U.S. Appl. No. 14/203,023, filed Mar. 10, 2014.

Final Office Action dated Nov. 24, 2015, U.S. Appl. No. 14/203,023, filed Mar. 10, 2014.

International Search Report and Written Opinion, dated May 16, 2013, PCT/US2012/0065180, filed on Nov. 15, 2012.

International Search Report and Written Opinion, dated Oct. 18, 2013, PCT/US2013/0024404, filed on Feb. 1, 2013.

International Search Report and Written Opinion, dated Aug. 14, 2013, PCT/US2012/0066353, filed on Nov. 21, 2012.

Office Action, dated Jun. 22, 2018, Canadian Application No. 2891368, filed on May 7, 2015, 3 pages.

Blodgett, O., "Blodgett's Basics: Good Weld Design is in the Details," Jan. 1, 2009, found at http://weldingdesign.com/archive/blodgetts-basics-goodweld-design-details, 4 pages.

Khaled, Terry, "An Outsider Looks at Friction Stir Welding," FAA Report, Jul. 2005, 72 pages.

Office Action (English Translation), dated Feb. 4, 2017, Chinese Patent Application No. 201380075274.0, filed on Feb. 1, 2013.

Fukuhara et al., "Development of a High-Speed Automatic Welding Process for Simultaneous Use on Inside and outside Surfaces of Pipes," Welding International, vol. 11, Issue 7, 1997, pp. 578-584.

\* cited by examiner

FSW TOOL WITH GRADUATED COMPOSITION CHANGE

CROSS-REFERENCE TO RELATED APPLICATION

This application is a continuation of and claims priority benefit under 35 U.S.C. § 120 to co-pending U.S. patent application Ser. No. 13/669,309, filed on Nov. 5, 2012, and entitled "FSW TOOL WITH GRADUATED COMPOSITION CHANGE", which is hereby incorporated by reference for all purposes as if reproduced in its entirety.

FIELD OF THE INVENTIVE SUBJECT MATTER

The field of the inventive subject matter is friction stir welding.

BACKGROUND

The background description includes information that may be useful in understanding the present inventive subject matter. It is not an admission that any of the information provided herein is prior art or relevant to the presently claimed inventive subject matter, or that any publication specifically or implicitly referenced is prior art.

Friction stir welding ("FSW") is a solid-state welding process in which a rotating tool heats and intermixes two workpieces at a seam. More specifically, the rotating tool has a pin that is pressed into the seam as the tool rotates, producing frictional heat between the tool and the workpieces. Enough heat is generated such that regions of the workpieces plasticize. A shoulder of the FSW tool assists in causing the plasticized regions to intermix, thus joining (i.e., friction stir welding) the workpieces at the seam. The rotating tool travels along the entire length of the seam to form a weld joint line between the two workpieces.

FSW provides numerous advantages over other welding processes, in part, due to the fact that FSW occurs at much lower temperatures and without a filler material. Some of the advantages of FSW include: better mechanical properties at the weld; less porosity, shrinkage, and distortion; little or no toxic fume emissions; no consumable filler material; and ease of automation. Since its conception in 1991, FSW has been heavily researched and successfully applied to numerous industries in a wide variety of applications.

Of particular importance in the present application is the welding of high strength workpieces such as high strength steel. European Patent Application Publication No. 1796865, for example, describes FSW processes for joining high strength steel pipelines. In such applications, the FSW tool must be made of a material that has exceptional strength, hardness, wear resistance, and has a high melting temperature. Such materials can be very expensive. Since FSW tools experience thermal wear, mechanical wear, and chemical wear, especially at the tip and shoulder, and eventually need to be replaced, the cost of FSW tools for FSW processes involving high strength workpieces can be prohibitive. It would be advantageous to provide a FSW tool that has a graduated compositional change, thus reducing the overall cost of the tool.

Various references describe coatings for FSW tools. The coatings improve the material properties of the tool tip for welding high strength materials. For example, International Patent Application Publication No. WO0185385 to Nelson describes a FSW tool that has a super abrasive coating (e.g., polycrystalline cubic boron nitride or polycrystalline diamond). Japanese Patent Application Publication No. JP2003326372A describes a diamond coated FSW tool.

Other references describe welding high strength materials with FSW tools that have been treated with surface hardening techniques. See, for example, Japanese Patent Application Publication No. JP2009255170 and International Patent Application Publication No. WO2009119543.

Coatings and surface hardening treatments can improve a FSW tool's hardness, wear resistance, and frictional/heat generation characteristics. While such FSW tools provide useful improvements for welding high strength materials, they fail to address the high costs associated with the actual base material of the FSW tools.

European Patent Application Publication No. EP1918059 to Park describes a FSW tool for welding of a wide range of materials, from aluminum to high strength steel. The FSW tool's pin is made of a Mo alloy that has a dual phase microstructure of Mo and intermetallic compound $Mo_5SiB_2$. Park further describes a FSW tool shank that is made of a different material than the pin. To some extent, Park addresses the high costs of FSW tools for high strength materials by providing a FSW tool that uses a different composition for the tool tip and the tool shank. However, Park fails to appreciate that the tool tip (see Park, FIG. 2, element 201) could have a graduated change of composition.

All materials and references cited herein are incorporated by reference to the same extent as if each individual reference were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved FSW tools.

SUMMARY OF THE INVENTIVE SUBJECT MATTER

The inventive subject matter provides apparatus, systems, and methods in which a friction stir welding (FSW) tool tip has a graduated change in composition. The tool tip comprises a pin portion and a body portion that meet to form a shoulder. The alloy composition of the pin, especially near its end, differs from the alloy composition of the body. In some embodiments, the compositional difference can be characterized as a difference in percent by weight of at least one chemical element. The percent by weight difference occurs at a distance from the shoulder of the tool tip and in the body portion. In other embodiments, the compositional difference comprises a difference in microstructure.

The inventive subject matter also provides methods for manufacturing a FSW tool tip that has a gradual change in composition. The method comprises blending a powder mixture, stacking the powder mixture in a container such that the stacked powder mixture includes a gradual change in composition, and applying a solid state densification process to produce a solid mass.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects, including improved tool tips for friction stir welding processes and machines.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
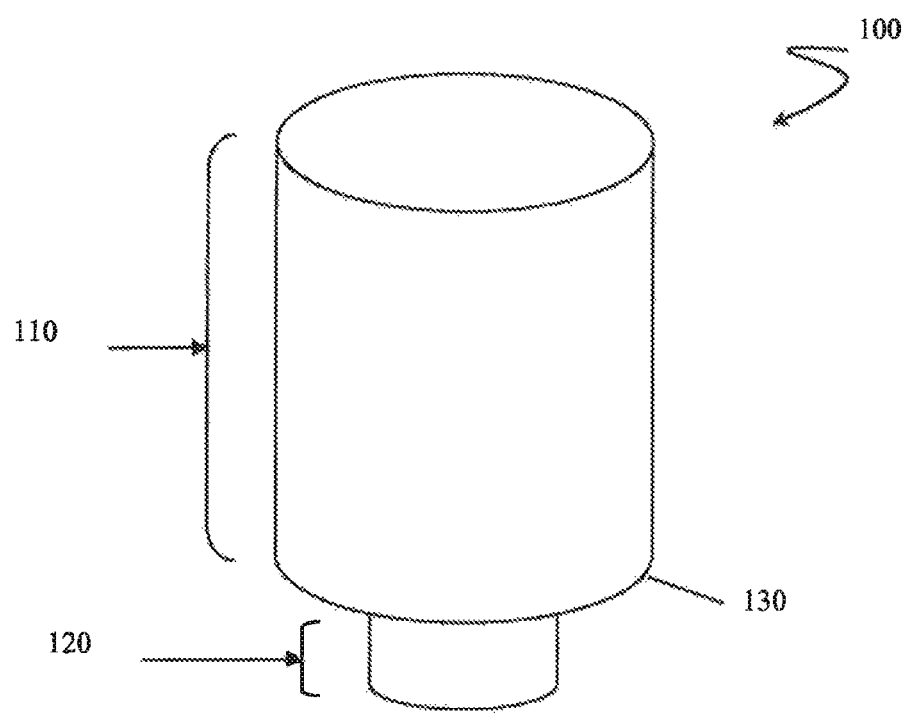
FIG. 1 is a side perspective view of a friction stir welding tool tip.
Figure 2:
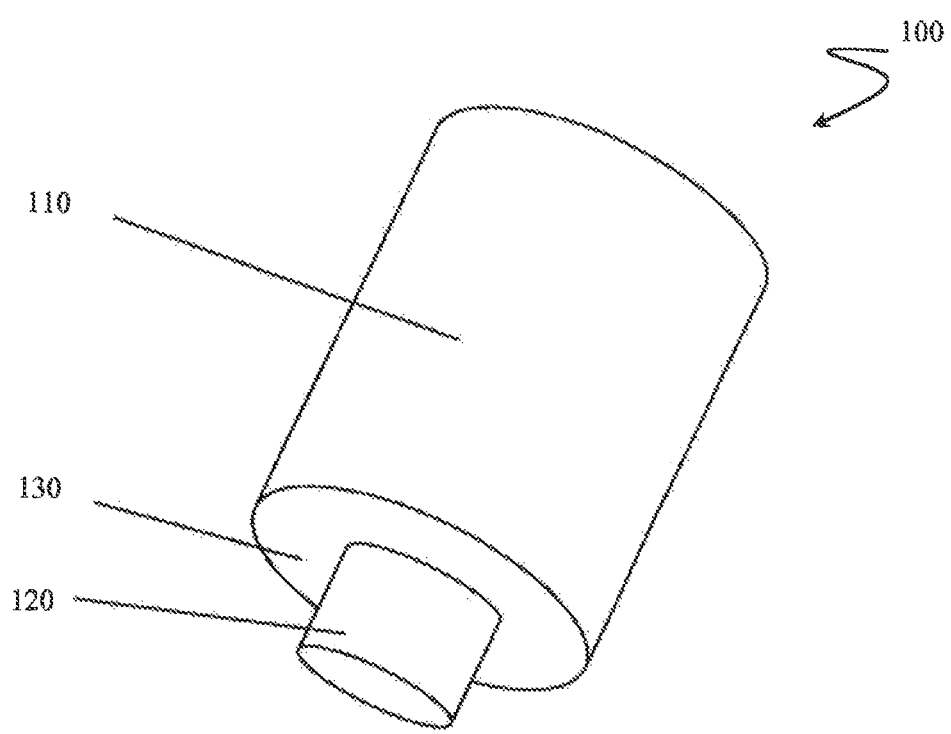
FIG. 2 is a bottom perspective view of the friction stir welding tool tip of FIG. 1.

FIG. 1 shows a side perspective view of friction stir welding tool tip 100. Tool tip 100 comprises a body portion 110 and a pin portion 120. Body portion 110 and pin portion 120 have a cylindrical shape. The diameter of pin portion 120 is smaller than the diameter of body portion 110. Together, pin portion 120 and body portion 110 meet to form a shoulder 130. FIG. 2 shows a bottom perspective view of tool tip 100, thus illustrating shoulder 130 and the bottom surface of pin portion 120.

Figure 3:
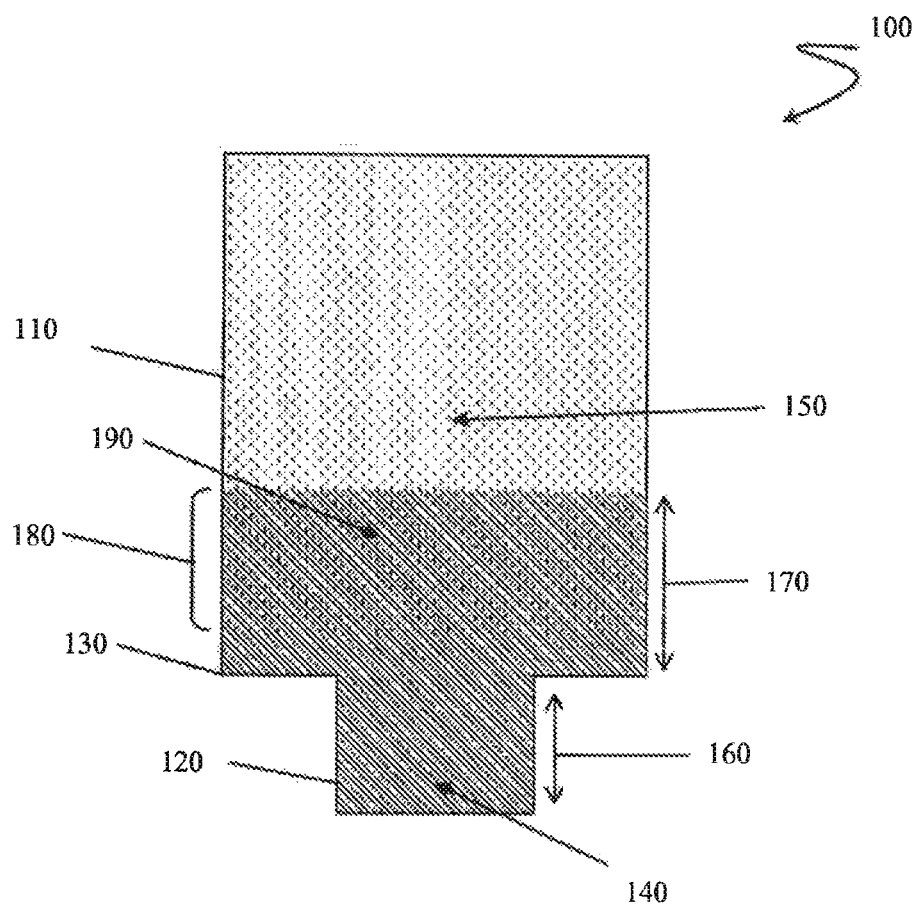
FIG. 3 is a cross sectional view of the friction stir welding tool tip of FIG. 1.

FIG. 3 shows a cross sectional view of tool tip 100 and illustrates the different alloy compositions of tool tip 100. Pin portion 120 comprises a first alloy composition 140, and body portion 110 comprises a second alloy composition 150. Between compositions 140 and 150 is a transitional region 180 having a third alloy composition 190. Third alloy composition 190 is a hybrid of first and second alloy compositions 140 and 150.

The compositional change from first alloy composition 140 to second alloy composition 150 occurs gradually along the length of tool tip 100. FIG. 3 shows this change starting to occur at a point above shoulder 130 (and in body portion 110). The change in composition is complete at distance 170 from shoulder 130. Those of skill in the art will appreciate that the change of composition could start at some point within pin portion 120 and could end at any point within body portion 110, without departing from the inventive concepts.

During operation, pin portion 120 penetrates the workpieces to be welded. Pin portion 120 and shoulder 130 are in direct contact with the workpieces during the welding processes and, as a result, will experience a high amount of stress/strain, wear, friction, and heat. A small length of body portion 110 may also come in direct contact with the workpieces during the welding process, however, body portion 110 generally experiences less stress/strain, wear, friction, and heat than pin portion 120 and shoulder 130.

First alloy composition 140 is chosen to allow pin portion 120 to be used to friction stir weld high strength materials, such as high strength steel. For example, composition 140 is selected to provide the necessary hardness, fracture toughness, heat transferability, and other material properties that allow tool tip 100 to come into direct contact with the high strength workpieces and form a solid state weld. Second alloy composition 150 is chosen such that body 110 provides the necessary hardness, fracture toughness, heat transferability, and other material properties for supporting tool tip 100 during the FSW process and for assisting pin portion 120 in forming a continuous solid state weld between high strength work pieces. Region 180 is also chosen so that it provides the necessary material properties for performing a FSW process on high strength material work pieces. For example, the size of region 180, the rate of compositional change, and the compositional change profile (e.g., linear, exponential, logarithmic, irregular, etc.) between a first element and a second element are selected such that tool 100 can perform a friction stir welding process for a specific application.

In general, the cost per volume of the first composition 140 will be greater than the cost per volume of the second alloy composition 150, since pin portion 120 requires higher strength and greater wear resistance than body portion 110. However, such need not be the case in every embodiment of the inventive subject matter. The inventive subject matter is not intended to be limited by any particular cost relationship between the first and second alloys of a FSW tool tip.

First and second alloy compositions differ from one another in at least one manner. As used herein, "difference" and "differs" with respect to alloy compositions can refer to either a difference in percent by weight ("wt") of at least one element or a difference in microstructure. For example, first alloy composition 140 could comprise 40% by wt of element A and 60% by wt of element B, and second alloy composition 150 could comprise 30% by wt of element A and 70% by wt of element B. In that example, first and second alloys are said to "differ" because they have at least one element that differs in percent by wt.

As another example, first alloy composition 140 could comprise elements A, B, and C, and second alloy composition 150 could comprise elements A and B. First and second alloy compositions 140 and 150 can be said to "differ" because they have a difference in percent by wt of at least one element (e.g., element C). In yet another example, first alloy composition 140 could comprise 40% by wt of element A and 60% by wt of element B, and having a primarily austenitic microstructure, and second alloy composition 150 could comprise 40% by wt of element A and 60% by wt of element B and having a martensitic microstructure. In this example, the first and second alloys are said to "differ" even though they comprise the same elements and percentages by wt because the microstructure is different.

Specifically contemplated alloy compositions include elements such as Niobium, Iridium, Tungsten, Rhodium, Rhenium, lanthanum, and rare earth elements. However, the present invention is not intended to be limited by any one particular combination of alloy compositions.

In some embodiments, first alloy composition 140 comprises between 0.2 and 25 wt % Rhodium. First alloy composition 140 could additionally include small amounts of lanthanum.

In other aspects of some embodiments, second alloy composition 150 comprises only 0.5 wt % of one element while first alloy composition 140 comprises at least 10 wt % of the element. Stated differently, first alloy composition 140 differs from second alloy composition 150 by 9.5 wt % of the element. In alternative embodiments, first alloy composition 140 differs from second alloy composition 150 by only 0.2 wt % of an element.

Figure 4:
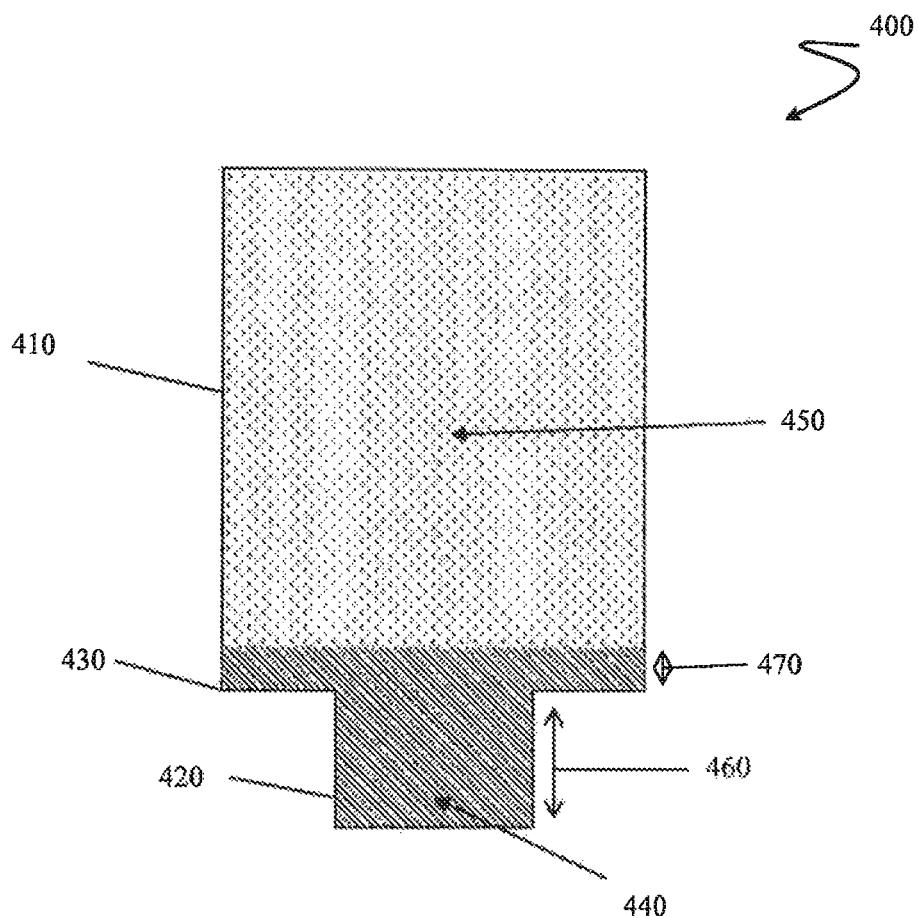
FIG. 4 is a cross sectional view of another friction stir welding tool tip.

FIG. 4 shows a cross section of a tool tip 400. Tool tip 400 is similar in size and proportion to tool tip 100. However, there are several differences in composition between tool tip 400 and tool tip 100. First, the rate of compositional change in tool tip 400 is sudden rather than gradual. As a result, tool tip 400 lacks a visible transitional region and a third alloy composition between first alloy composition 440 and second alloy composition 450. Second, the change in composition occurs at a much closer distance to the tool tip shoulder (i.e., distance 470 is shorter than distance 170). It should also be noted that distance 470 is shorter than length 460 while distance 170 is longer than length 160.

In some embodiments, the compositional change between the first and second alloy compositions is gradual, continuous, and linear. In such embodiments, the exact point at which the transitional region begins and ends may not be readily apparent. The point of complete change from one composition to another can be best estimated by averaging the compositional content of horizontal cross sections of the tool tip taken at various points along the length of the tool tip. In other embodiments, the rate of compositional change is sudden, as is the case in tool tip 400 (see FIG. 4). In yet other embodiments, the change occurs in a non-linear fashion (e.g., logarithmic or exponential).

In another aspect of some embodiments, the point at which the compositional change is complete will occur at a location relatively close to the tool tip shoulder (and in the body portion), as is the case with tool tip 400 (see FIG. 4). In other applications, the point of complete compositional change will occur at a point farther from the shoulder (and in the body portion), as is the case in tool tip 100 (see FIG. 3), For conceptual purposes, the distance from the shoulder can be thought of as a length relative to the length of the pin portion. For example, the point of complete compositional change could be a distance from the shoulder that is less than, greater than, equal to, half of, or twice as the length of the pin portion.

Again, the rate of change in the composition of the tool tip, and the point at which the change is complete, are not mere design choices. Different applications of the inventive concepts will have unique requirements (e.g., material properties of the workpieces to be welded, weld quality required, time constraints, space constraints, project budget) that could influence the compositional configuration of the FSW tool tip.

Figure 5:
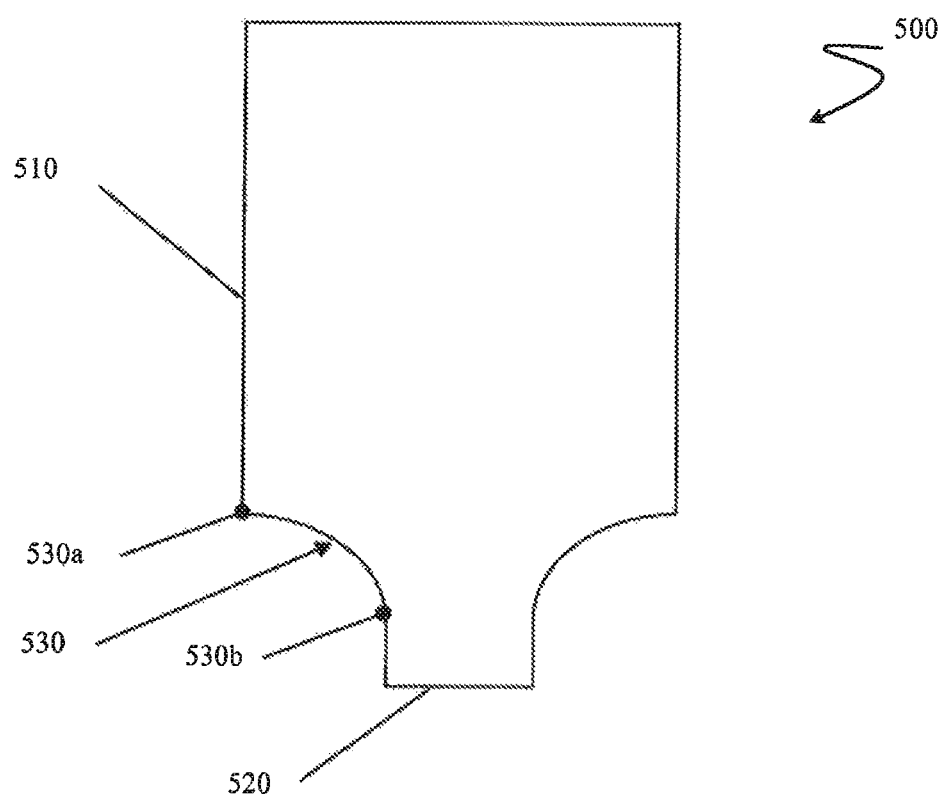
FIG. 5 is a side view of another friction stir welding tool tip.

FIG. 5 shows a side view of a tool tip 500. Tool tip 500 is similar to tool tip 100 except that shoulder 530 is a curved surface (i.e., a conical and concave surface) rather than a flat surface. Viewed from another perspective, the change in diameter between pin portion 520 and body portion 510 is gradual rather than sudden. FIG. 5 demonstrates one of many variations in the tool tip shape/profile that can be used consistently with the inventive subject matter. For tool tip embodiments that have a non-planar shoulder, the distance from the "shoulder" is measured from the point on the shoulder that is farthest from the pin end (e.g., point 530a rather than point 530b) into the body. Stated different, the distance from the "shoulder" is measured from the point on the shoulder that initially has the largest shoulder diameter.

Figure 6:
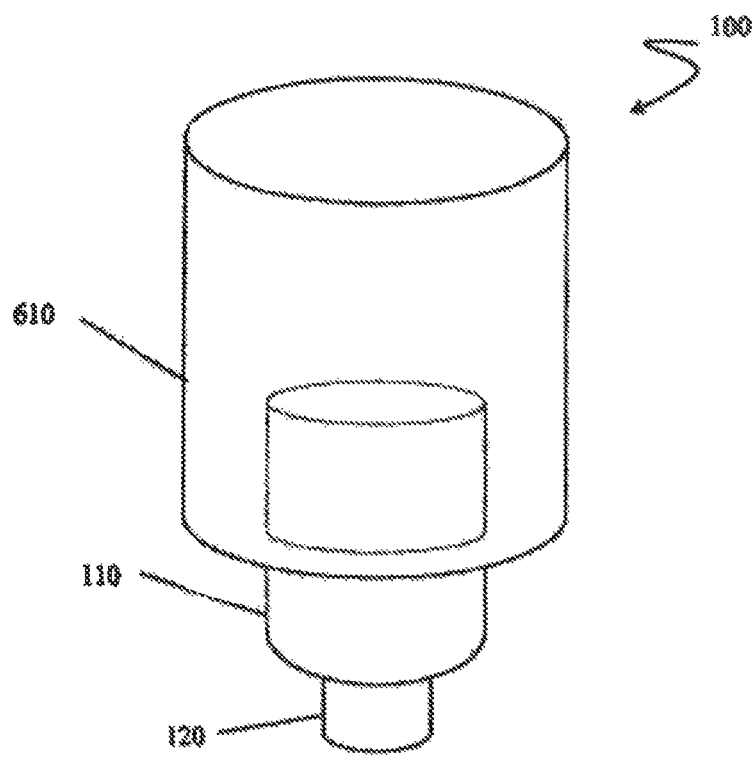
FIG. 6 is a perspective view of the tool tip of FIG. 1 coupled with a shank.

FIG. 6 shows a perspective view of tool tip 100 coupled with a shank 610. Shank 610 is used to provide a gripping surface for coupling tool tip 100 with a "master" (e.g., a collar or chuck) of a FSW machine. Tool tip 100 can be manufactured integrally with shank 610 or, alternatively, could be manufactured separately and coupled with shank 610 using fasteners (e.g., screws, press-fitted) or joining process (e.g., diffusion welding, ultrasonic welding).

Figure 7:
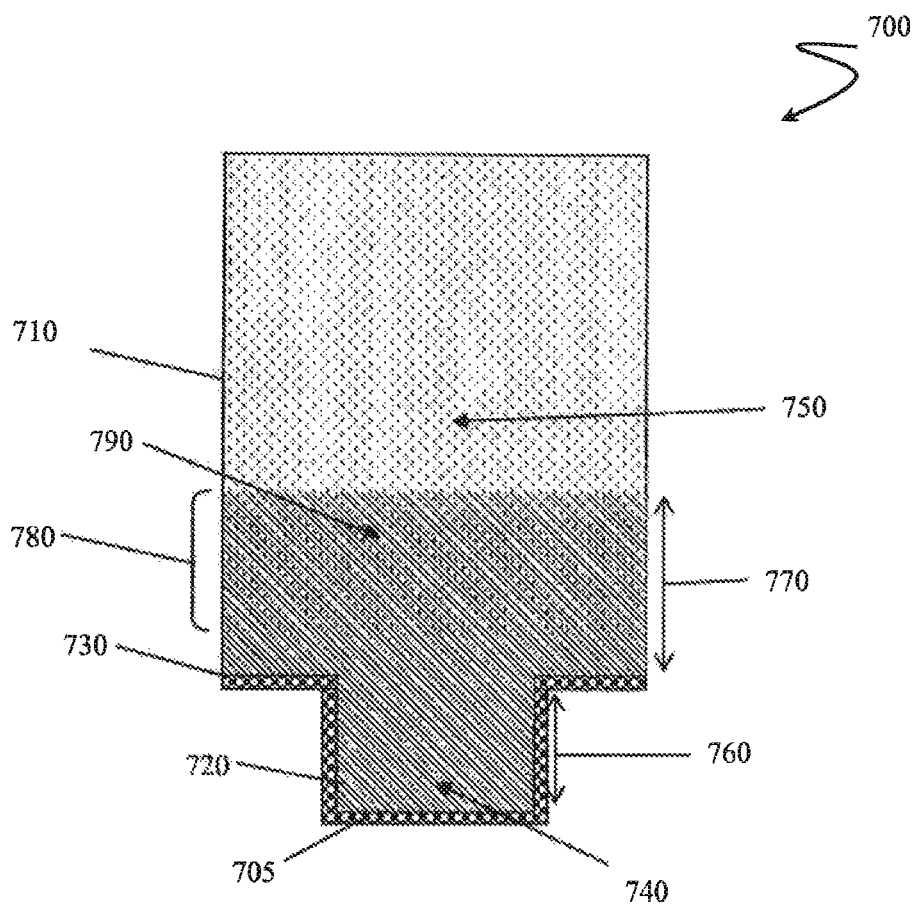
FIG. 7 is a cross sectional view of another embodiment of a friction stir welding tool tip.

FIG. 7 shows a cross sectional view of another tool tip 700. Tool tip 700 is similar to tool tip 100 except that it has a coating 705. Coatings for FSW tool tips are well known, and coating 705 can comprise any composition suitable for improving performance of tool tip 700. Alternatively, coating 705 could comprise a surface hardened layer, either in lieu of the coating or in addition to the coating. For tool tip 700, the first alloy composition 740 is the composition of pin 720 near, but not right at, the outer surface of pin 720.

FSW tool tips have been studied heavily, and numerous variations, configurations, sizes, shapes, and manufacturing techniques exist. Those of skill in the art will appreciate that the inventive concepts disclosed herein can be used consistently with any FSW tool tip configuration that is suitable for friction stir welding two or more workpieces together.

Figure 8:
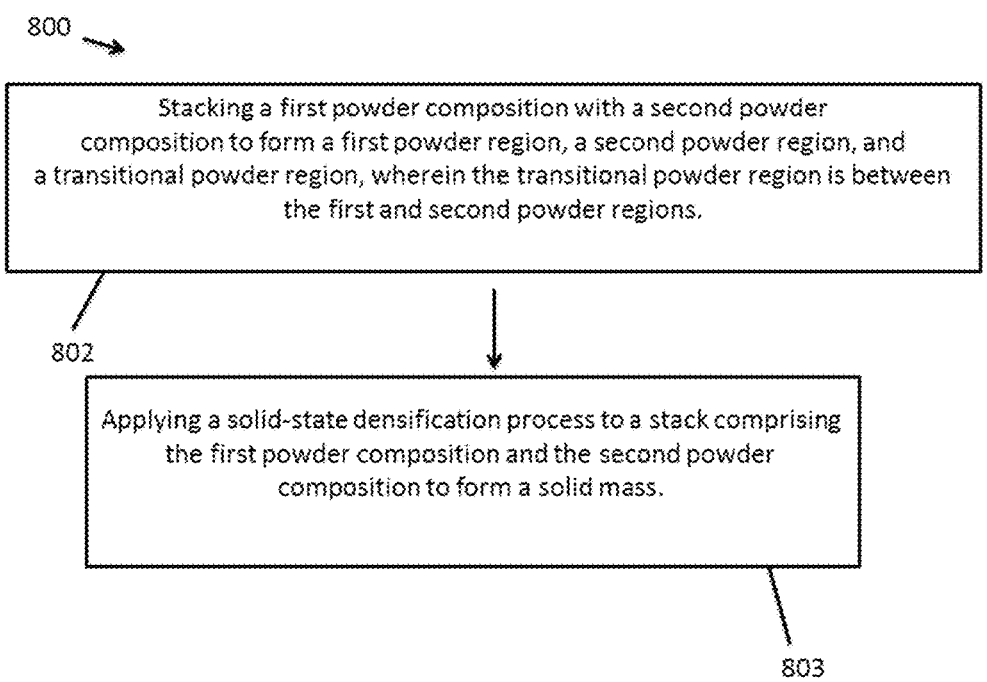
FIG. 8 is a schematic of a process for manufacturing a friction stir welding tool tip with a graduated change in composition.
Figure 9:
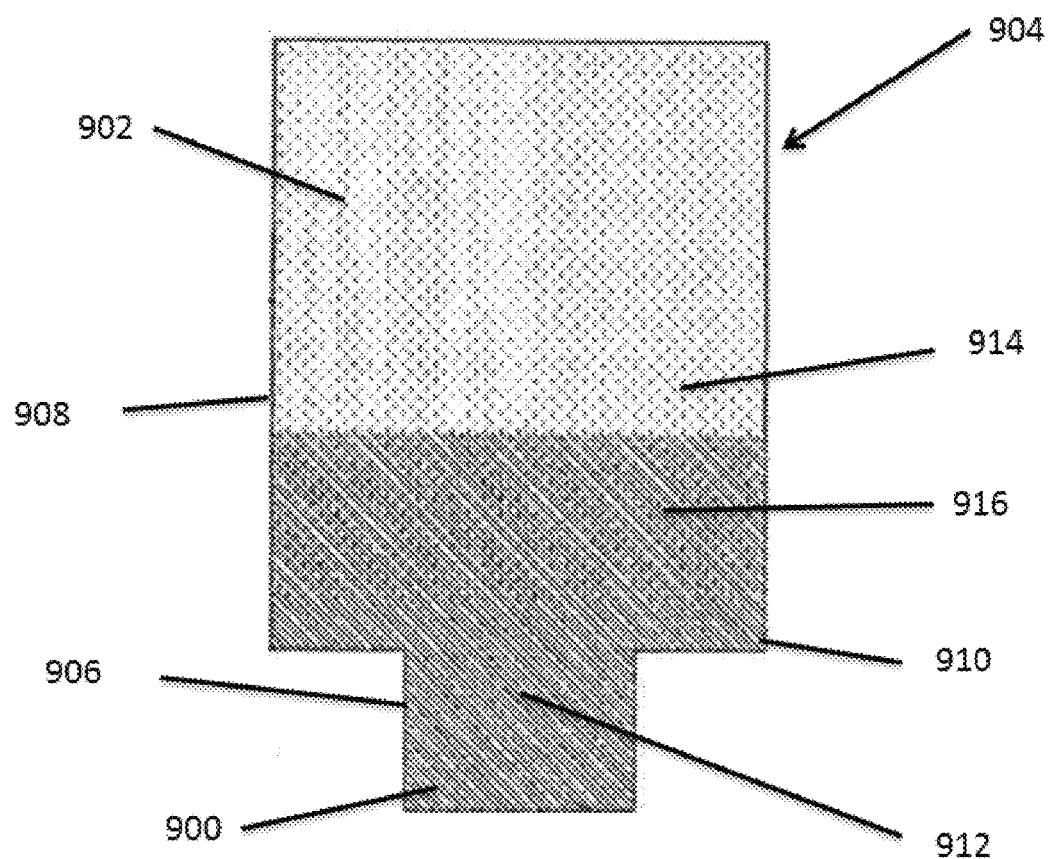
FIG. 9 is a cross sectional view of a container including a mixture of powders.

With reference to FIG. 3, FIG. 8, and FIG. 9, a method 800 of manufacturing a FSW tool tip having a gradual compositional change is illustrated. Step 802 is to stack a first powder composition 900 with a second powder composition 902 in a container 904 that has a pin portion 906 and a body portion 908 that meet to form a shoulder 910. The first and second powder compositions 900, 902 are stacked such that a first powder region 912 is disposed in the pin portion 906, a second powder region 914 is disposed in the body portion 908, and a transitional powder region 916 is disposed between the first and second powder regions 912, 914. The first powder region 912 comprises the first powder composition 900, the second powder region 914 comprises the second powder composition 902 and the transitional powder region 916 comprises a gradual compositional change from the first powder composition 900 to the second powder composition 902.

Step 803 is to apply a solid-state densification process to the stacked powder compositions 900, 902 to form a solid mass. The resulting solid mass has a first solid region comprising a first alloy composition, a second solid region comprising a second alloy composition, and a transitional solid region between the first and second solid regions. The composition of the transitional solid region gradually changes from the first alloy composition to the second alloy composition.

In some embodiments, the solid state densification process is a hot isostatic pressing process.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range.

Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed, No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of manufacturing a friction stir welding tool having a gradual compositional change, comprising:
    stacking a first powder composition with a second powder composition to form a stack in a container having a pin portion and a body portion that meet to form a shoulder, such that the stack has a first powder region disposed in the pin portion, a second powder region disposed in the body portion, and a transitional powder region between the first and second powder regions, wherein the first powder region comprises the first powder composition, the second powder region comprises the second powder composition, and the transitional powder region comprises a gradual compositional change from the first powder composition to the second powder composition; and
    applying a solid-state densification process to the stack to form a solid mass having a first solid region comprising a first alloy composition, a second solid region comprising a second alloy composition, and a transitional solid region between the first and second solid regions, wherein the transitional solid region comprises a gradual compositional change from the first alloy composition to the second alloy composition, wherein applying the solid-state densification process further comprises forming a logarithmic or exponential compositional change from the first alloy composition to the second alloy composition.

2. The method of claim 1, wherein the solid-state densification process is a hot isostatic pressing process.

3. The method of claim 1, wherein applying the solid-state densification process further comprises:
    forming the first solid region in the pin portion out of the first powder region;
    forming the second solid region in the body portion out of the second powder region; and
    forming the transitional solid region out of the transitional powder region.

4. The method of claim 3, wherein applying the solid-state densification process further comprises forming the gradual compositional change from the first alloy composition to the second alloy composition.

5. The method of claim 4, wherein the first alloy composition differs from the second alloy composition by at least 0.2 wt % of an element.

6. The method of claim 5, wherein the first alloy composition differs from the second alloy composition by at least 0.2-9.5 wt % of the element.

7. The method of claim 5, wherein the element is selected from the group consisting of Niobium, Iridium, Tungsten, Rhodium, Lanthanum, and Rhenium.

8. The method of claim 5, wherein the element comprises at least 0.5 wt % of the second alloy composition.

9. The method of claim 5, wherein the element comprises at least 1 wt % of the second alloy composition.

10. The method of claim 1, further comprising forming a coating on at least a portion of an outer surface of the pin portion, wherein the coating has a Vickers hardness of at least 600 Hv.

11. The method of claim 1, further comprising forming a diamond coating on at least a portion of an outer surface of the pin portion.

* * * * *